US006314515B1

(12) United States Patent
Miller et al.

(10) Patent No.: US 6,314,515 B1
(45) Date of Patent: *Nov. 6, 2001

(54) RESETTING MULTIPLE PROCESSORS IN A COMPUTER SYSTEM

(75) Inventors: David A. Miller, Houston; Kenneth A. Jansen; Montgomery C. McGraw, both of Spring; Darren J. Cepulis, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/356,472

(22) Filed: Jul. 19, 1999

Related U.S. Application Data

(63) Continuation of application No. 09/200,276, filed on Nov. 24, 1998, now abandoned, which is a continuation of application No. 09/014,154, filed on Jan. 27, 1998, now Pat. No. 5,867,703, which is a continuation of application No. 08/700,300, filed on Aug. 20, 1996, now Pat. No. 5,729,675, which is a continuation of application No. 08/538,779, filed on Oct. 3, 1995, now Pat. No. 5,596,759, which is a continuation of application No. 08/051,601, filed on Apr. 22, 1993, now Pat. No. 5,497,497, which is a continuation of application No. 07/431,743, filed on Nov. 3, 1989, now abandoned.

(51) Int. Cl.[7] .................................................. G06F 15/177

(52) U.S. Cl. ..................................................... 713/1; 713/2

(58) Field of Search ............................... 713/1, 2; 709/100, 709/102, 103, 104, 106, 107

(56) References Cited

U.S. PATENT DOCUMENTS

| 4,335,426 | 6/1982 | Maxwell et al. ...................... 395/652 |
|---|---|---|
| 4,455,601 | 6/1984 | Griscom et al. ...................... 364/200 |
| 4,590,554 | 5/1986 | Glazer et al. ......................... 364/200 |
| 4,591,975 | 5/1986 | Wade et al. ........................... 395/733 |
| 4,628,508 | 12/1986 | Sager et al. ...................... 395/182.11 |
| 4,633,392 | 12/1986 | Vincent et al. ....................... 364/200 |
| 4,779,187 | 10/1988 | Letwin ................................. 364/200 |
| 4,787,032 | 11/1988 | Culley ................................. 364/200 |

(List continued on next page.)

OTHER PUBLICATIONS

IBM Technical Disclosure Bulletin, vol. 27 No. 1B, pp. 512–514, Jun. 1984.

Compaq Computer Corporation, Compaq Deskpro 386/20 Technical Reference Guide, vol. 1, pp. 4–32 to 4–36, Oct. 1987.

Compaq Computer Corporation, Compaq Deskpro 386/20 Technical Reference Guide, vol. 1, pp. 4–43 to 4–44, Aug. 1988.

Compaq Computer Corporation, Compaq Deskpro 386/20 Technical Reference Guide, vol. 1, pp. 4–27 to 4–28, May 1987.

*Primary Examiner*—Dennis M. Butler
(74) *Attorney, Agent, or Firm*—Sharp, Comfort & Merrett, P.C.

(57) ABSTRACT

Two design variations which allow multiple processors to start up using a single ROM are disclosed. In each design, a single, primary processor is allowed to perform a complete POST while the remaining, secondary processors are directed in the course of their POST to perform a more limited initialization sequence. At power on, the primary processor begins a normal POST, while the secondary processors are held until a vector is placed into a redirection vector location. Each secondary processor is then subsequently started, using its own initialization code located at the address indicated by the redirection vector. The first technique is applicable to general multiprocessor systems because the implementation of this design can be run either from external software or from an addition to the operating system of the particular machine on which it is being used. The second technique is more specifically oriented to a particular system, and includes the use of an identity register to differentiate between primary and secondary processors.

27 Claims, 6 Drawing Sheets

U.S. PATENT DOCUMENTS

| | | | |
|---|---|---|---|
| 4,823,256 | 4/1989 | Bishop et al. | 395/182.08 |
| 4,825,358 | 4/1989 | Letwin | 364/200 |
| 4,984,151 | 1/1991 | Dujari | 395/588 |
| 5,027,273 | 6/1991 | Letwin | 364/200 |
| 5,101,339 | 3/1992 | Fairman et al. | 395/400 |
| 5,109,339 | 4/1992 | Fairman et al. | 395/400 |
| 5,109,512 | 4/1992 | Bahr et al. | 395/650 |
| 5,497,497 | 3/1996 | Miller et al. | 395/800 |
| 5,590,554 | 1/1997 | Glazer et al. | 364/200 |
| 5,596,759 | 1/1997 | Miller et al. | 395/750 |
| 5,729,675 * | 3/1998 | Miller et al. | 714/36 |
| 5,867,703 * | 2/1999 | Miller et al. | 713/1 |

* cited by examiner

RESETTING MULTIPLE PROCESSORS IN A COMPUTER SYSTEM

This is a continuation of U.S. patent application Ser. No.: 09/200,276 filed Nov. 24, 1998, abandoned, which is a continuation of U.S. patent application Ser. No.: 09/014,154 filed Jan. 27, 1998, U.S. Pat. No. 5,867,703, which is a continuation of U.S. patent application Ser. No.: 08/700,300 filed Aug. 20, 1996, U.S. Pat. No. 5,729,675, which is a continuation of U.S. patent application Ser. No.: 08/538,779 filed Oct. 3, 1995, U.S. Pat. No. 5,596,759, which is a continuation of U.S. patent application Ser. No.: 08/051,601 filed Apr. 22, 1993, U.S. Pat. No. 5,497,497, which is a continuation of U.S. patent application Ser. No.: 07/431,743 filed Nov. 3, 1989, abandoned.

BACKGROUND OF THE INVENTION

1. Field of the Invention

The present invention relates to multiple processors in computer systems and more particularly to multiple processors having a common reset using a single ROM.

2. Description of the Prior Art

The personal computer industry is a vibrant and growing field that continues to evolve as new innovations occur. The driving force behind this innovation has been the increasing demand for faster and more powerful personal computers. New and increasingly more complex applications for personal computers are continually being developed, and the computer programs required to implement these new applications have experienced a corresponding increase in size and complexity, requiring greater amounts of time for the computer to be able to run them properly. As a result, personal computers have been burdened with lengthier amounts of software instructions that take increasing amounts of time for them to execute.

To meet the challenge of these new software applications, computer designers have used various methods to increase the speed with which personal computers can process instructions. Historically, the personal computer has developed as a system utilizing a single microprocessor to handle all instruction execution. The microprocessor is the key working unit or "brains" of the personal computer, and its task is to handle all of the instructions that programs give it in the form of computer software. The methods that have been used to increase speed in the personal computer have generally centered around maximizing the efficiency with which this single microprocessor can handle instructions.

Limits are being reached, however, on the amount of speed that can be obtained from a system based on a single microprocessor. The obvious choice to remove this constraint has been the incorporation of multiple microprocessors operating in parallel into a computer system. With the use of multiple processors, or multiprocessing, each microprocessor can be working on a different task at the same time. The use of multiprocessing has generally increased computer performance, but it has also resulted in numerous difficulties that were not found in a single processor environment.

A problem that has arisen in multiprocessing has been how to start up 6r initialize each of the processors without them interfering with each other. In a single processor personal computer environment, the microprocessor generally initializes itself by performing a POST (power on self test). The POST program is located in the computer's ROM, which is a special type of memory that is permanently recorded into the computer. This special memory cannot be written to or changed by software and is nonvolatile, meaning that turning off the computer will not disturb it. The ROM holds a key set of programs that provide essential support for the operation of the computer, among these the test and initialization programs known as the POST, which make sure that the computer is in good working order at power on. The POST program usually includes the microprocessor placing the memory in a known state, testing any memory, placing peripherals in a tested, reset and ready condition and loading or booting up the operating system, among other things.

The problem that arises in multiprocessing is that, in a system where multiple processors coexist sharing a common bus and a common memory, it would be catastrophic for more than one processor to perform a complete POST. For example, if one processor had completed a POST and was up and running, a subsequent processor attempting to perform a POST would re-initialize the peripherals and memory that the previous processor was now using to run its code, resulting in a potential error for the first processor.

For this reason it would seem necessary in a multiprocessing environment for each processor to have its own ROM with which to bring itself to a working state so that one processor's initialization would not interfere with another processor that may already be up and running. However, this scheme would require that numerous ROM's be present in the computer, one associated with each processor, resulting in an unnecessarily large amount of nonvolatile memory being used for this purpose. A further problem that would be associated with the use of multiple ROM's would be the resultant complexity and loading effects on the bus that these ROM's share with the processor. Therefore, it would be highly desirable for these multiple processors to be able to start or "boot" up using a single, common ROM as opposed to each processor containing a different ROM in memory.

For further background on the present invention, it is necessary to examine some of the special features and considerations involving the Intel Corporation (Intel) family of microprocessors, which are used in personal computers compatible with those manufactured and sold by International Business Machines Corp. (IBM). The Intel 80286 microprocessor introduced a new feature that allowed it to operate in two different modes: real mode and protected mode. In real mode, the 80286 behaves very much like the 8088 microprocessor that was in the original IBM PC, thus allowing for full compatibility with these older systems. In protected mode, there are no compatibility considerations, and the 80286 is allowed to utilize all of its special features for maximum capability.

A problem soon became apparent, however, in that, while provisions were made for the 80286 microprocessor to switch from real to protected mode, no provisions were made for the 80286 to return from protected to real mode. This problem was corrected in the Intel 80386 microprocessor, but could only be remedied in the 80286 through the use of the reset operation to return the processor to real mode. The reset operation, however, generally required the computer to perform a complete reset and reboot, and this was found to be unnecessary for the purpose of simply returning the computer from protected to real mode. Therefore, it was determined that some method was needed to indicate whether each reset operation was simply a software reset used for protected to real mode switching or a true system reset, and, as a result, a byte was provided in the CMOS nonvolatile memory available in the computer system to reflect whether or not a full reboot of the system was necessary. At power on, this byte reflects a "normal POST" status, informing the processor that a protected mode reset is not occurring and that a full boot is necessary to begin operation. When the processor is up and running, the status of this byte is changed to reflect a "vector on reset" status when a protected to real mode change is desired, thus informing the processor that a complete reboot is unnecessary.

The processor generally polls the status of this reset byte during its POST program so that the protected to real mode switch can be made with a minimum of lost time. At power on, the normal POST boot status of the reset byte directs the microprocessor to perform a complete POST, whereas, when the processor has been up and running and has its RESET pin toggled, the vector on reset status of the reset byte directs the processor away from the remainder of the POST program to an alternate memory location which is contained in a reset vector location. This memory location is the location desired upon entry into real mode to continue operation of the computer.

SUMMARY OF THE INVENTION

The present invention includes two design variations which allow multiple processors to start up using a single, common ROM. These designs, or techniques, are intended for use in a multiprocessing environment and utilize a system whereby each processor is directed to begin a normal POST, but only a single processor is allowed to perform a complete POST, whereas the remaining processors are directed very early in their POST procedure to perform a limited initialization sequence. The first design is intended for more general applications and is adaptable to any system incorporating multiple processors. This design can be implemented either by the operating system of the particular machine, or by software specifically written for this purpose, with minimal hardware requirements. The second technique is intended to be more particularly adapted to a specific computer and is executed from the POST procedure that is stored in the computer's ROM. This design has a hardware requirement in that an identity register is used to differentiate between the microprocessor performing the complete POST and the remaining microprocessors. This second design also includes a method for allocating tasks to the secondary processors once they are running.

In each of these designs, at power on the processor which performs the complete POST, referred to as the primary processor or processor $P_1$, begins a POST while the remaining processors which perform alternate initialization sequences, referred to as secondary processors or in the singular as Processor $P_Z$, are held in an inactive state. In the first design, an initialization procedure for each processor $P_Z$ commences when the processor $P_1$ has completed its POST program. This initialization procedure includes the processor $P_1$ placing a vector in the reset vector memory location pointing to initialization code that processor $P_Z$ will execute, changing the reset byte in the CMOS non-volatile memory to reflect a vector on reset status, and enabling address line A20. When the processor $P_Z$ is activated, it begins a POST as the processor $P_1$ did, but the vector on reset status in the CMOS reset byte directs the processor $P_Z$ to vector off to a different location in ROM containing its initialization code, which it executes. When the processor $P_Z$ has been successfully dispatched, it notifies the processor $P_1$, which then restores the CMOS reset byte and the vector at the reset vector memory location to their original values as well as the original state of A20. This technique is repeated until all the processors have been initialized.

In the second design the initialization process of each processor $P_Z$ occurs during the POST program being executed by the processor $P_1$. A register in the computer's hardware is used to differentiate between the processor that performs the complete POST, the processor $P_1$, and the remaining processors, represented by the processor $P_Z$, which utilize a more limited initialization scheme. Early in the course of the POST sequence, each processor is directed to the identity register, which informs it as to whether it is a primary or secondary processor. If the processor is determined to be the processor $P_1$, it is allowed to continue with its POST. If the processor is determined to be the processor $P_Z$, it is instructed by the POST program to use a vector placed in the reset vector memory location by the processor $P_1$ to transfer operation to a different location in the ROM containing the more limited initialization code.

Generally, at power on the processor $P_1$ is activated to begin a POST while the processor $P_Z$ remains in a held state. The activation and initialization of the processor $P_Z$ is directed from the latter part of the POST procedure that is executed by the processor $P_1$. The processor $P_1$ releases the processor $P_Z$ and then polls a semaphore location to determine if the processor $P_Z$ has completed its initialization. When the processor $P_Z$ has completed its initialization, it notifies the processor $P_1$ and places itself on hold, at which time the processor $P_1$ completes the initialization of any other processors $P_Z$ and then completes the POST.

Upon completion of the POST, the processor $P_1$ is running, and subsequently the operating system begins allocating various tasks to the processor $P_Z$. When the operating system decides to give the processor $P_Z$ a task, the processor $P_1$ takes the processor $P_Z$ out of hold and provides it with a vector pointing to the code that the processor $P_Z$ is to execute. The processor $P_1$ and the processor $P_Z$ communicate back and forth through a semaphore in memory as to when the processor $P_Z$ has begun execution of its task and when it has completed it. When the processor $P_Z$ has finished its task, it generally places itself in a held state to make it ready to receive other tasks from the operating system. This cycle of task allocation then repeats itself. The processor $P_1$ may optionally direct the processor $P_Z$ to execute a reset code at any time, this having the utility of resetting the processor $P_Z$ to a known state prior to starting an operation.

BRIEF DESCRIPTION OF THE DRAWINGS

A better understanding of the invention can be obtained when the following detailed description of the preferred embodiment is considered in conjunction with the following drawings, in which.

DESCRIPTION OF THE PREFERRED EMBODIMENT

A computer system incorporating the present invention can utilize one of several design variations that allow multiple processors to start up using a single, common ROM with minimal changes to the ROM from single processor ROM's. The following designs will be discussed with specific reference to Intel 80386 or 80486 microprocessors being the microprocessors utilized in the multiprocessor system, but the use of other processors is also contemplated. Throughout the course of this description, the secondary processors will be referred to in the singular as the processor $P_Z$, but it is understood that multiple secondary processors may coexist in this environment.

Figure 1:
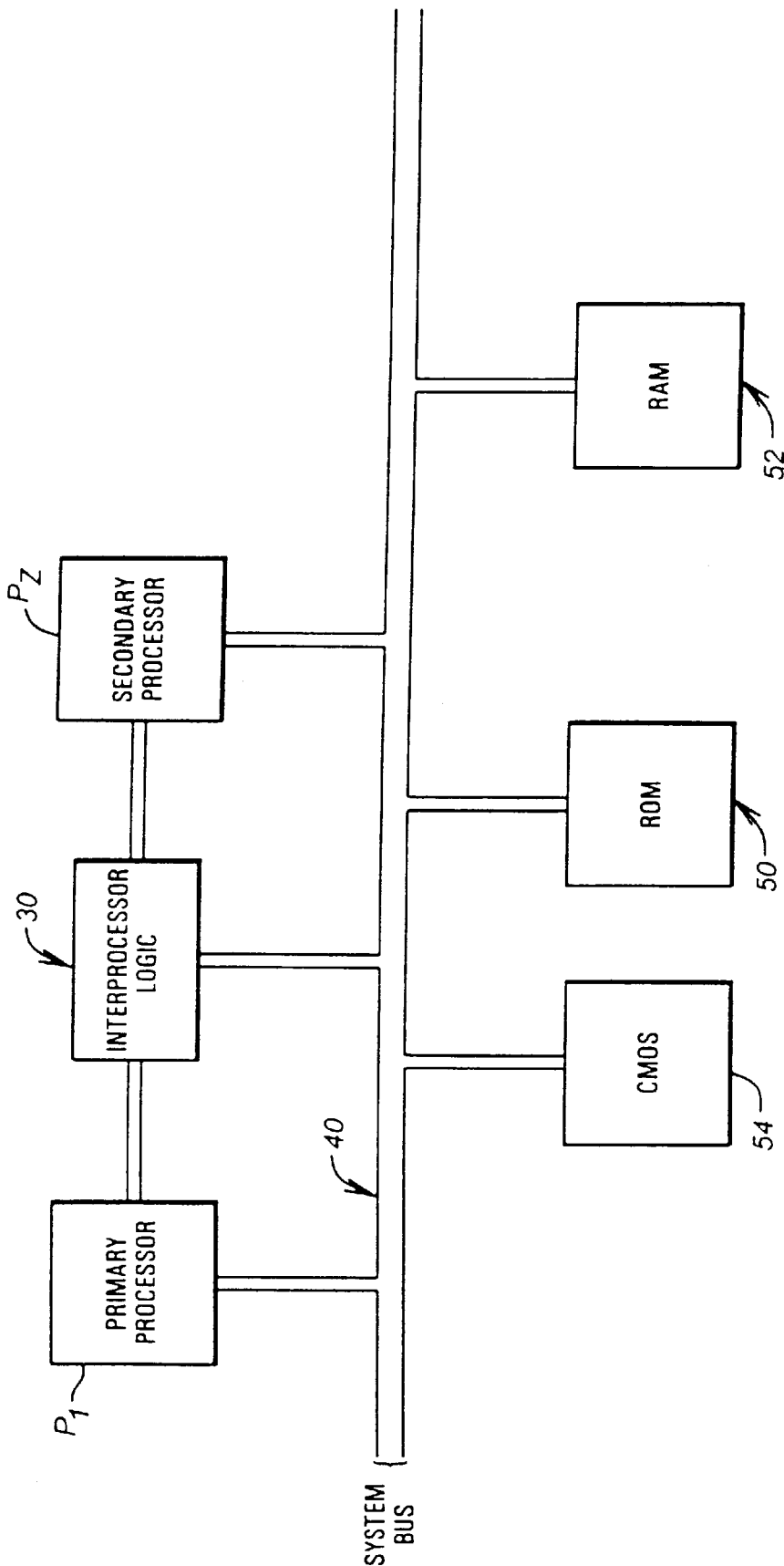
FIG. 1 is a schematic block diagram of a computer system incorporating the present invention.

Referring now to FIG. 1, the letter C designates generally a computer system incorporating either of the two designs according to the present invention. Many of the details of a typical computer that are not relevant to the present invention have been omitted for the purpose of clarity. The system C generally includes a primary processor $P_1$, a secondary processor $P_Z$, and various interprocessor logic circuitry 30 that is connected between the primary processor $P_1$ and the secondary processor $P_Z$. Both the primary processor $P_1$ and the secondary processor $P_Z$ each generally include a cache subsystem (not shown). The interprocessor logic 30 generally includes various option and status registers and circuitry relating to the operation of the processors. The primary processor $P_1$, the secondary processor $P_Z$, and the interprocessor logic circuitry 30 are each connected to a system bus 40 which generally includes an address bus and a data bus as well as various control and status lines that allow for the proper functioning of the computer C. Also attached to the system bus is read only memory (ROM) 50, which includes the start-up program that initializes the multiple processors according to the present invention called the power on self test (POST); random access memory (RAM) 52 which forms the main memory of the system C; and CMOS memory 54 which is used to provide nonvolatile, random access memory for use by the system C.

In each of the designs according to the present invention, at power on the primary processor, processor $P_1$, is activated and begins a POST (power on self test) which is located in the ROM 50 of the computer system, while the secondary processor $P_Z$, is kept in a held state. This activation of the processor $P_1$ and holding of the processor $P_Z$ is accomplished in slightly different manners in the two designs. In the first design a reset bit, which is located preferably in a register in the interprocessor logic circuitry 30 referred to as the Processor Option Register is used. The reset bit generally operates similarly for all processors such that a setting of the reset bit, which occurs at power up by hardware control, results in the RESET input of the respective processor being pulsed and causes the respective processor to be placed in a held state. A subsequent clearing of the reset bit releases the respective processor from its held state and allows the respective processor to begin the POST. Therefore, at power on the reset bit of the processor $P_1$ is toggled, allowing the processor $P_1$ to begin the POST, while the reset bit of the processor $P_Z$ is set but not cleared, thereby keeping it in a deactivated or held state.

The second design utilizes a sleep bit located in the Processor Option Register in the interprocessor logic 30 associated with each processor $P_Z$. The sleep bit operates such that, when it is set for a respective processor, requests for the bus 40 by the respective processor are blocked. Therefore, in the second design, the processors $P_1$ and $P_Z$ each have their reset bit toggled and a sleep bit is set on the processor $P_Z$. The toggling of the reset bit of the processor $P_1$ allows it to begin the POST, while the setting of the sleep bit on the processor $P_Z$, which occurs at power up by hardware control, causes any requests for the bus by the processor $P_Z$ to be blocked, thus effectively placing the processor $P_Z$ in a held state. A subsequent clearing of the sleep bit of the processor $P_Z$ by the processor $P_1$ allows bus requests by the processor $P_Z$ to be passed, thereby allowing the processor $P_Z$ to begin the POST. Therefore, in each of these designs, at power on the reset bit of the processor $P_1$ is generally toggled by the power on circuitry (not shown) of the computer system C, allowing it to begin a POST, while the processor $P_Z$ is kept in a deactivated or held state.

Figure 2:
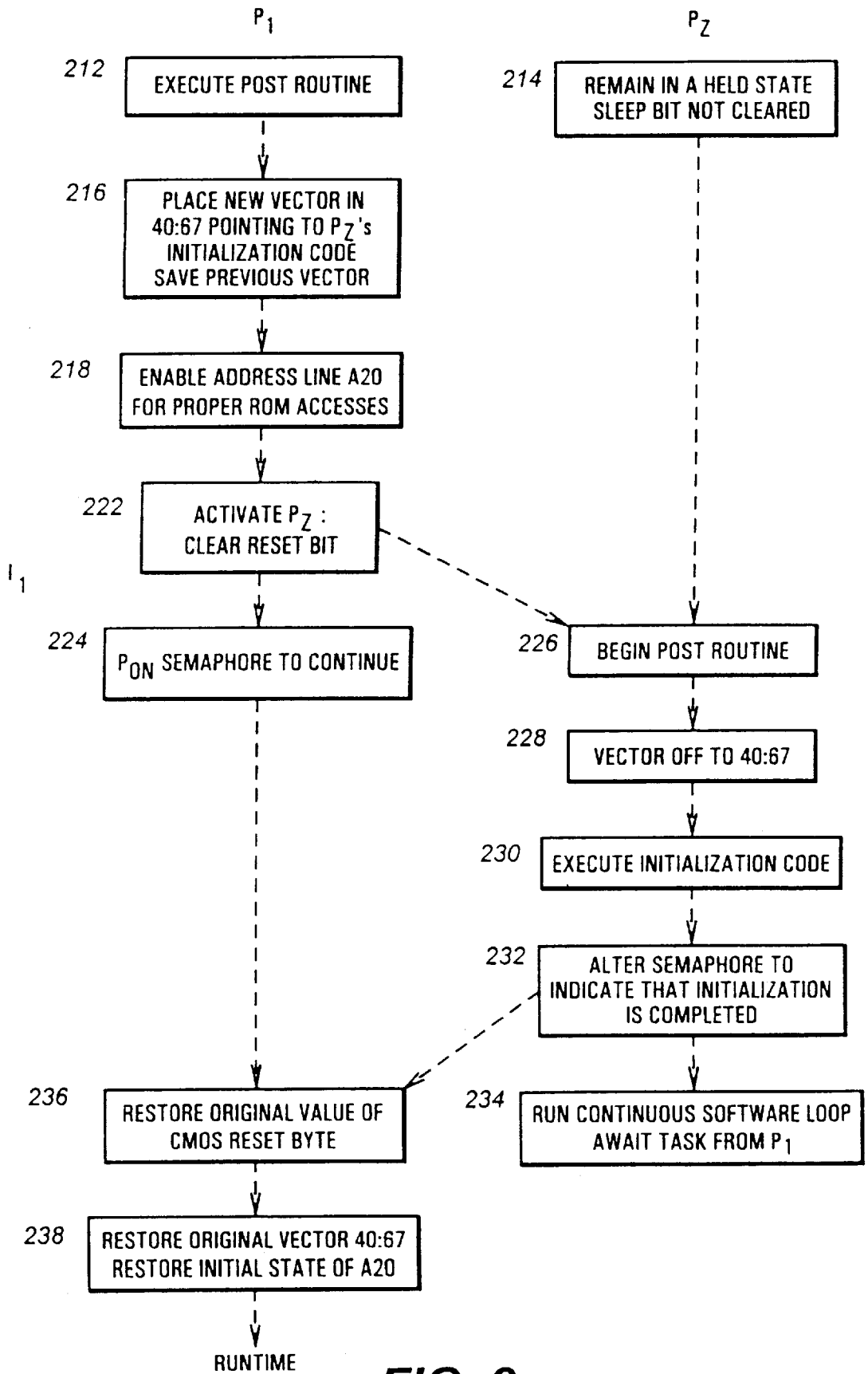
FIG. 2 is a flow chart diagram of a first design for initializing the multiple processors using a single ROM according to the present invention.

In the first design according to the present invention, as shown in FIG. 2, when the processor $P_1$ (FIG. 1) has finished a sufficient portion of its POST routine in step 212 to allow start up of the processor $P_Z$ (FIG. 1), the software implementing this design performs an initialization procedure $I_1$ to bring the processor $P_Z$ into an active state. First, in step 216, the vector at memory location 40:67 in the ROM 50 (FIG. 1), which is the reset vector memory location, is replaced with a new vector pointing to initialization code located in the ROM 50 that will be executed by the processor $P_Z$ when it is enabled. The vector that was previously stored in this location is saved for later restoration.

In step 218, the processor $P_1$ performs a similar replacement procedure with the CMOS non-volatile memory reset byte, which is preferably located in the CMOS 54. The CMOS reset byte is located at address location 0Fh in the CMOS memory 54 and is accessed through ports 070h and 071h, as is standard for addressing the CMOS memory in the IBM PC compatible computers. The status of this byte reflects whether a normal boot or vector on reset is necessary when the processor $P_Z$ reads this value in the POST sequence. The processor $P_1$ will have previously interrogated this location and have found the normal boot value present, enabling it to begin a normal POST. The current value of the CMOS reset byte is saved in step 218 to a temporary location, preferably to a register in the processor $P_1$. The CMOS reset byte is then changed to value 0Ah, this value signifying that the computer system C is or has been running and that only a vector on reset is necessary instead of the normal POST routine that a processor would normally follow at power on. This change, in effect, fools the processor $P_Z$ into thinking that it has already performed the POST operations. The 0Ah value written to the CMOS reset byte is the reset without EOI value and is utilized to prevent the Processor $P_Z$ from clearing the interrupt controller, as this is unnecessary and might inadvertently cause an error.

Address line A20 of the system address bus 40 (FIG. 1) is enabled in step 220 to allow the processor $P_Z$ to properly access high memory in the ROM 50 where the POST program is located. Address line A20 had previously been disabled in the POST routine of the processor $P_1$ (step 212) for software compatibility reasons, these stemming from the use by previous programmers of a feature of the 8086 microprocessor whereby the program counter rolled over to 0000h after FFFFFh due to the maximum of twenty address lines available in that microprocessor. This roll over was incorporated into software written for these older 8086 microprocessor-based systems for various purposes, the end result for current purposes being that, in order to maintain compatibility with this older software, address line A20 was disabled during the POST of the processor $P_1$ (step 212). Consequently, address line A20 must be re-enabled in step 220 to allow the processor $P_Z$ to address the bootstrap program which is preferably located in high memory in the ROM 50.

In step 222, the processor $P_1$ clears the reset bit in the Processor Option Register of the Processor $P_Z$, thereby activating the processor $P_Z$ to begin the POST routine in step 226. The processor $P_Z$ comes out of reset and vectors to the reset location in the ROM 50 where the POST program is located. This is the same location where processor $P_1$ vectored to after reset, this being a general function of the microprocessors used in the present invention. Thus, both the processors $P_1$ and $P_Z$ operate from the same ROM 50 immediately after reset execution. Very early in the execution of the POST routine, the processor $P_Z$ polls the CMOS reset byte to determine its status. As the CMOS reset byte was previously changed by the processor $P_1$ in step 218 to value 0Ah, reflecting a vector on reset status, the processor $P_Z$ in step 228 is directed to the reset vector memory location 40:67. This location contains the vector which was placed there earlier by the processor $P_1$ in step 216, and this vector is used in step 230 to direct the processor $P_Z$ to its alternate initialization code, preferably located in the ROM 50 but alternatively located in RAM 52 after being loaded by the processor $P_1$. This initialization code generally includes the processor $P_Z$ executing any specific reset code, testing its cache memory and performing other processor $P_Z$ dependent features.

After activating the processor $P_Z$ in step 222, the processor $P_1$ awaits the successful dispatch of the processor $P_Z$ in step 224 by polling a semaphore bit which is preferably located in the RAM 52. A final step 232 in the initialization sequence performed by the processor $P_Z$ involves the processor $P_Z$ altering the semaphore bit to signal to the processor $P_1$ that the initialization sequence has been successfully completed. When step 232 is completed, the processor $P_Z$ begins performing a software loop in step 234, waiting until it is directed by the operating system to perform a task.

When the processor $P_1$ receives notification by way of the changed semaphore bit that the processor $P_Z$ has completed its initialization, the processor $P_1$ proceeds to step 236 where it restores the original value of the CMOS reset byte from its temporary location. The processor $P_1$ then proceeds to step 238 where the original vector is returned to the reset vector memory location 40:67 and the initial state of address line A20 is restored. The processor $P_1$ then continues with its operation.

Referring again to FIG. 1, the second design according to the present invention is similar in many respects to the first, but is tailored for a two processor system C (FIG. 1) incorporating one primary processor, referred to as the processor $P_1$, and one secondary processor, referred to as the processor $P_2$. The expansion of this design to incorporate multiple secondary processors, however, is also contemplated.

This second design is also different from the first in that it utilizes an identity register located in the interprocessor logic 30 called the Who-Am-I register to differentiate between primary and secondary processors. The Who-Am-I register resides preferably in the system I/O port space and is used by software to determine whether the processor $P_1$ or the processor $P_2$ is currently active. The possible contents of this register include a value 00h to represent that the processor $P_1$ is currently active, a value F0h to represent that the processor $P_2$ is currently active, and a value FFh to represent that neither the processor $P_1$ nor the processor $P_2$ are active.

Figure 3:
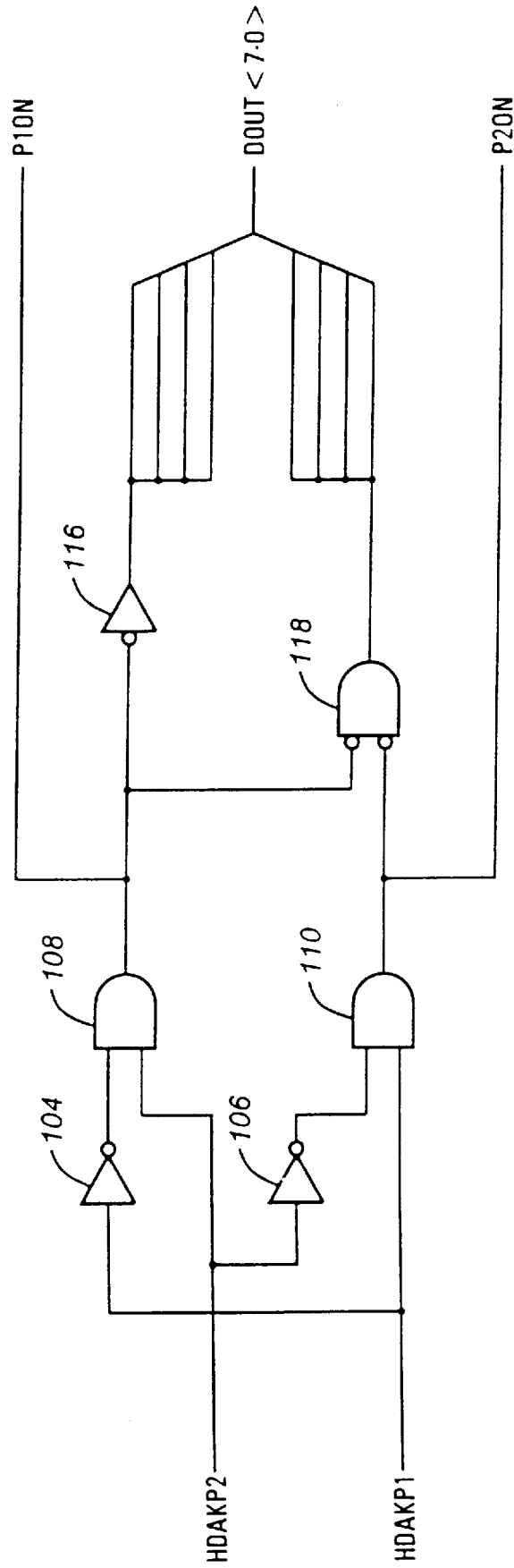
FIG. 3 is a circuit diagram of an identity register called the Who-Am-I port according to the present invention.

Referring now to FIG. 3, the contents of the Who-Am-I register are determined by the hold acknowledge (HLDA) outputs from the processor $P_1$ and the processor $P_2$, the HDAKP1 and HDAKP2 signals, respectively. The hold acknowledge signal is generally asserted high when the respective processor is in a held or inactive state and is generally negated low when the respective processor is currently active. In the preferred embodiment if a processor $P_1$ or $P_2$ is reading the location it is active and the other processor must be inactive to allow the active processor access to the register, thus allowing the determination. The two hold acknowledge signals HDAKP2 and HDAKP1 are inverted by inverters 106 and 104, respectively. The output of the inverter 104 and the HDAKP2 signal are inputs to a two input AND gate 108, whose output is the P1ON signal. The P1ON signal is connected to the input of an inverter 116, whose output provides the upper four bits of the Who-Am-I register. The output of the inverter 106 and the HDAKP1 signal are inputs to a two input AND gate 110, whose output signal is the P2ON signal. The P1ON and P2ON signals are inputs to a two input NOR gate 118, whose output provides the lower four bits of the Who-Am-I register. Therefore, by polling the status of the Who-Am-I register, the processor is able to determine whether it is the processor $P_1$ or the processor $P_2$.

The Who-Am-I register can be readily expanded to indicate the active status of a greater number of processors than the two utilized in the present invention. This expandability can be achieved by reducing the numbers of output bits driven for each processor and incorporating the respective hold acknowledge signals of each of the additional processors through the appropriate logic, allowing for up to 8 processors to be identified in each byte.

Figure 4:
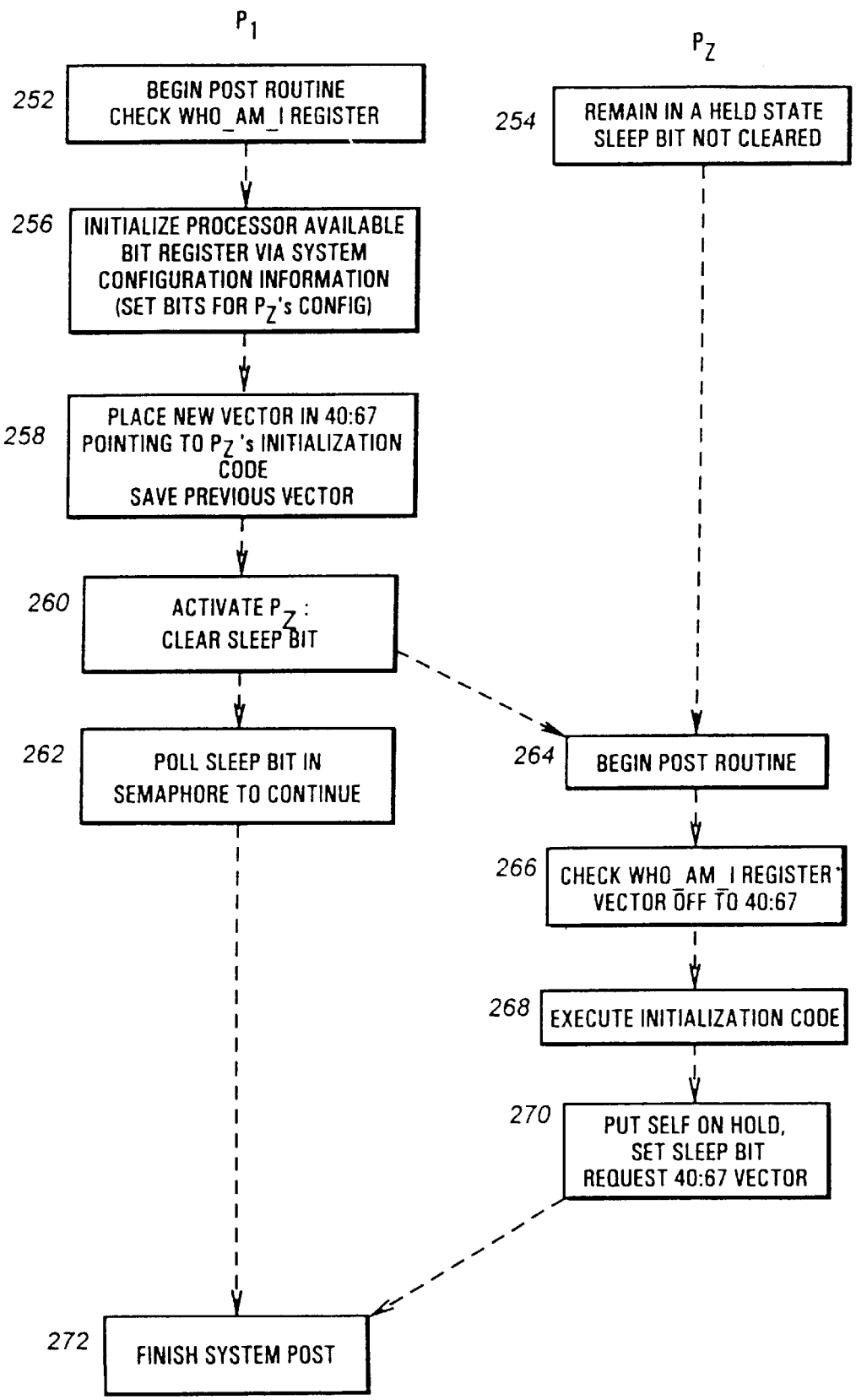
FIG. 4 is a flow chart diagram of a second design for initializing the multiple processors using a single ROM according to the present invention.

Referring now to FIG. 4, the second design begins similarly to the first in that in step 252 the processor $P_1$ is allowed to begin a POST, while in step 254 the processor $P_2$ is held inactive. At power on the processor $P_1$ generally has its reset bit toggled, allowing it to begin a POST. The processor $P_2$ also has its reset bit toggled, but the sleep bit of the processor $P_2$ is set, and this has the utility of blocking any bus requests by the processor $P_2$, thereby keeping the processor in a held state. Early in the execution of the POST sequence in step 252, the processor $P_1$ is directed to the Who-Am-I register (FIG. 3), which informs it that it is in fact the processor $P_1$, thereby allowing it to resume execution of the POST program. During the remaining course of the POST, the processor $P_1$ is directed by the POST program to execute the following initialization procedure for the processor $P_2$.

In step 256 the processor $P_1$ initializes a processor available bit register, preferably located in the interprocessor logic 30 (FIG. 1) of the computer C, from configuration information contained in the CMOS memory 54.

The processor available register contains a sequence of bits that serve as an indicator to the various processors as to what other processors are available to be given tasks to perform. In general, each secondary processor preferably has a representative availability bit in the processor available register that reflects whether or not that processor is available for dispatching. If the respective availability bit of a secondary processor is set, then that processor is available for dispatching, and if the respective availability bit of a secondary processor is cleared, then that processor is not available for dispatching and is assumed to be either currently dispatched or not present within the system. If the CMOS memory 54 is found to be invalid during initialization, all of the availability bits in the processor available register are cleared. The processor available register is initialized in step 256 to reflect the present configuration of the system, this being which secondary processors, represented by the processor $P_2$, coexist in this environment with the primary processor $P_1$. The processor available register in the second design according to the present invention is configured to include two microprocessors, one primary processor $P_1$ and one secondary processor $P_2$, but a configuration of the processor available register to incorporate a greater number of microprocessors than two is also contemplated.

In step 258, the processor $P_1$ proceeds with the initialization procedure by storing the current vector from the reset vector memory location 40:67 into a temporary location and replacing it with a new vector pointing to initialization code that the processor $P_2$ will execute when it is enabled. In step 260, the processor $P_1$ activates the processor $P_2$ by clearing the sleep bit in its Processor Option Register, enabling the processor $P_2$ to begin the POST program in step 264. After enabling the processor $P_2$ in step 260, the processor $P_1$ begins polling the sleep bit associated with the processor $P_2$. The sleep bit is used here as a handshake between the processor $P_1$ and the processor $P_2$ to indicate when the processor $P_2$ has finished its initialization procedure and has been placed on hold. Preferably, if processor $P_1$ does not see the sleep bit set by the processor $P_2$ after a certain period of time, the processor $P_1$ sets the reset bit of the processor $P_2$, effectively placing the processor $P_2$ in a held state, and then continues with the POST. A different Processor Option Register is preferably used for each additional secondary processor incorporated into the multiprocessing environment.

The processor $P_2$ begins the POST sequence in Step 264 after the processor $P_1$ clears its sleep bit. The processor $P_2$ is directed in step 266 to the Who-Am-I register (FIG. 3) to determine its identity, just as the processor $P_1$ was in step 252 during its execution of the POST program. The Who-Am-I register informs the processor $P_2$ that it is a secondary processor and directs it to vector off based on the value in the reset vector memory location 40:67. This memory location contains the vector previously placed there by the processor $P_1$ in step 258, and this vector points to the alternate initialization code which the processor $P_2$ executes in step 268. The alternate initialization code is preferably located in the ROM 50 but may be alternatively located in RAM 52 after being loaded by the processor $P_1$. This initialization code generally includes the processor $P_2$ executing any specific reset code, testing its cache memory, and programming its noncacheable address map, as well as any other processor $P_2$ dependent features. Upon completion of its initialization code in step 268, the processor $P_2$ places itself on hold in step 270 by setting the sleep bit in its own Processor Option Register. The setting of the sleep bit places the processor $P_2$ in a hold state as soon as the bus 40 must be requested and serves as notification to the processor $P_1$ that the processor $P_2$ has finished its initialization procedure. Completing step 270, the processor $P_2$ performs a jump or branch instruction requiring that the value at the reset vector 40:67 be obtained. Because this results in a bus request, the processor $P_2$ goes into a held state. When the processor $P_1$ receives this notification in step 272, it resumes execution of the remainder of its POST.

Figure 5:
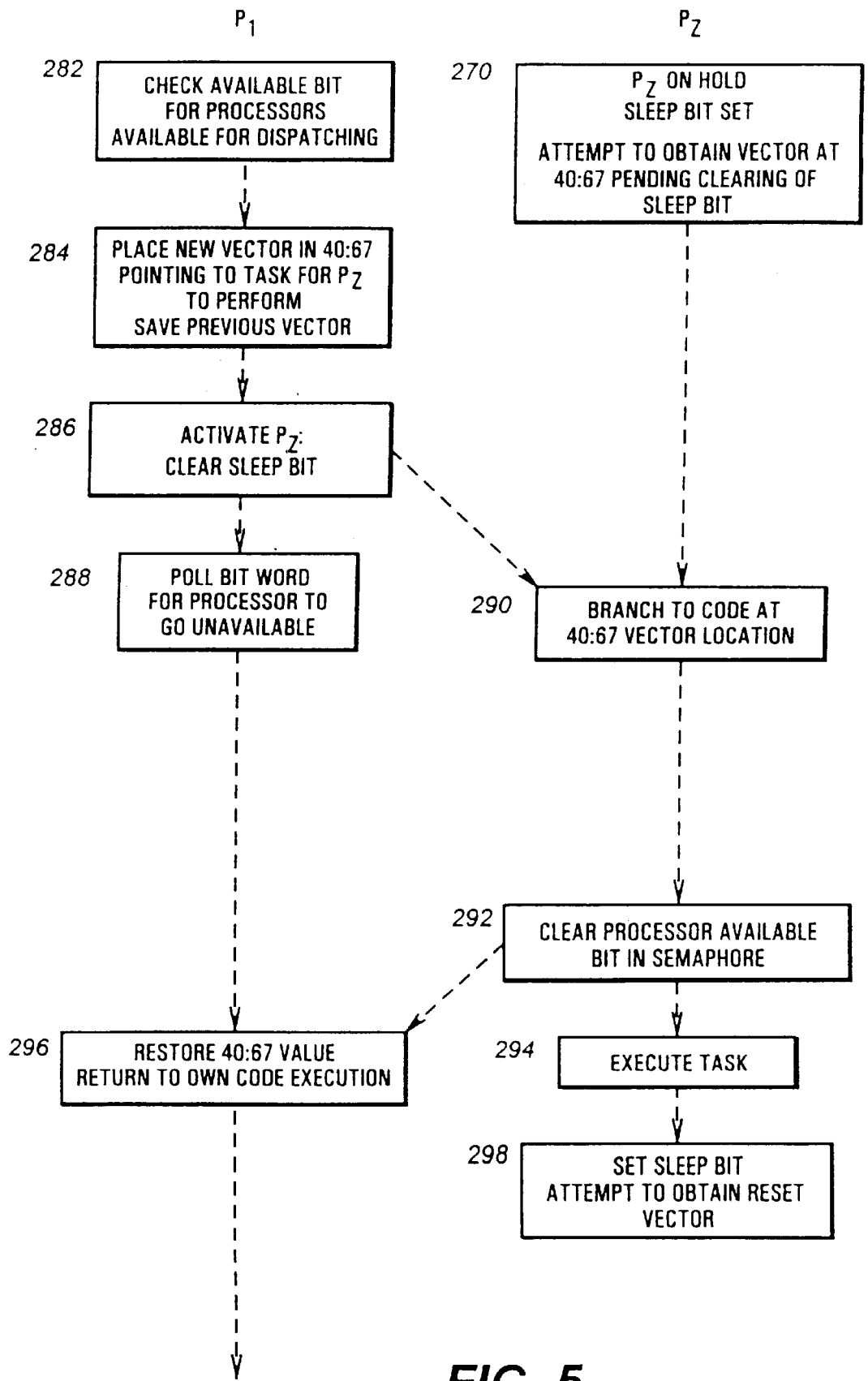
FIG. 5 is a flow chart diagram of a design for dispatching tasks to secondary processors according to the present invention.

Upon completion of the POST, the primary processor, processor $P_1$, is running, and the operating system subsequently begins an allocation of various tasks to each secondary processor. The following allocation procedure will be discussed with reference to a computer system C incorporating a particular secondary processor referred to as the processor $P_2$, but the incorporation of multiple secondary processors in the task allocation scheme is also contemplated. Referring now to FIG. 5, when the operating system has a task for the processor $P_2$ to perform, it directs the processor $P_1$ to perform the following dispatch procedure for the processor $P_2$.

The processor $P_1$ first checks the status of the respective availability bit of the processor $P_2$ in the processor available register in the interprocessor logic in step 282 to determine if the processor $P_2$ is available for dispatching. This availability bit was initially set by the processor $P_1$ in step 256 (FIG. 4) according to the configuration information held in the CMOS memory 54 and this bit is subsequently cleared whenever the processor $P_2$ is given a task to perform. If the availability bit of the processor $P_2$ is not set, then the operating system knows that either the processor $P_2$ has not yet finished the task that it was previously given or that the processor $P_2$ is not presently configured to the system. In either case, the processor $P_2$ is determined to be unavailable. If the availability bit of the processor $P_2$ is set, then the operating system commences with the allocation of the task in step 284 by placing a vector in memory location 40:67 pointing to software which generally includes the task that the operating system wishes the processor $P_2$ to execute. The processor $P_1$ saves the previous value from memory location 40:67 for later restoration.

The processor $P_1$ then activates the processor $P_2$ in step 286 by clearing the sleep bit in the processor $P_2$'s Processor Option Register located in the interprocessor logic 30 in step 286, causing the processor $P_2$ in step 290 to obtain the vector at memory location 40:67 to begin operation of the new task. An attempt to obtain the vector at memory location 40:67 was actually the last instruction executed by the processor $P_2$ in the POST procedure in step 270. This vector fetch is by definition a cache miss so that the processor $P_2$ must use the bus. However, the sleep bit was set in step 270, disabling any bus request, so the vector fetch is pending, waiting for the sleep bit to be cleared. Once the sleep bit is cleared, the processor $P_2$ can properly access the bus and obtain the vector at memory location 40:67 pointing to the task that it is to execute. The first instruction in this new task is step 292 which directs the processor $P_2$ to clear its respective availability bit in the available bit register to indicate to the operating system that it is no longer available for dispatching and that it has commenced with the task. After this, the processor $P_2$ begins executing the task in step 294.

The clearing of the availability bit by the processor $P_2$ serves as notification to the processor $P_1$ that the processor $P_2$ has begun execution of the task that the oprating system has given it. Upon receiving this notification, in step 296 the processor $P_1$ restores the previous vector to the reset vector memory location 40:67 and then resumes the execution of its own code. When the processor $P_2$ has finished executing its task in step 294, it sets the sleep bit in its Processor Option Register in step 298, blocking any further bus requests, and then attempts to obtain the reset vector at memory location 40:67. In this way, operation of the processor $P_2$ is again held at the vector fetch operation as described previously in step 270, and processor $P_2$ is available to receive a new task from the operating system.

Figure 6:
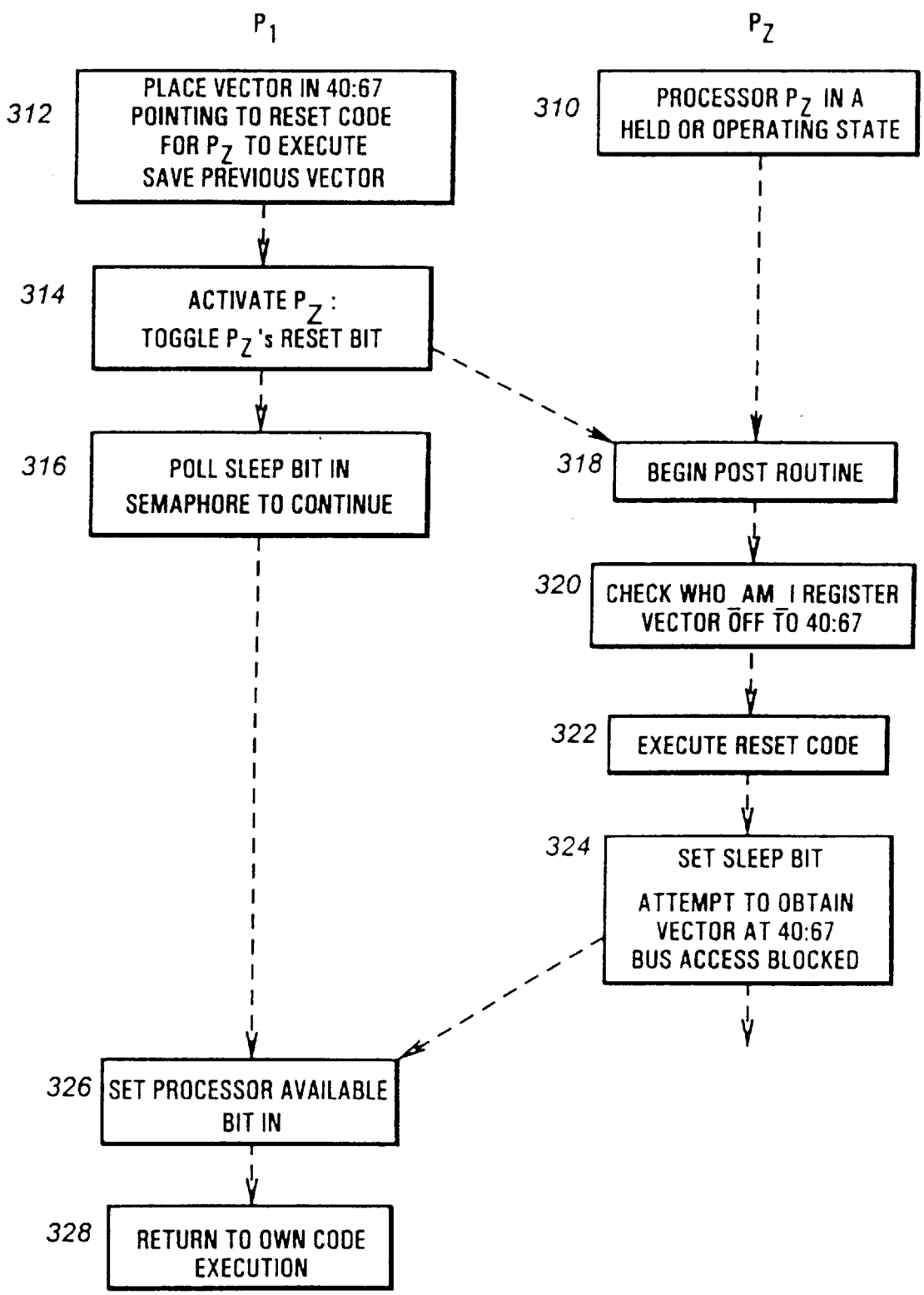
FIG. 6 is a flow chart diagram of a design for resetting secondary processors after dispatching according to the present invention.

In certain cases, it may be necessary to reset the processor $P_2$ to a known state in order to make it available for further dispatching. In these cases, the processor $P_1$ performs the following Reset-After-Dispatch routine to reset the processor $P_2$ to a known state. Referring now to FIG. 6, in step 312, the processor $P_1$ first places a vector in memory location 40:67 pointing to the reset code that the processor $P_2$ is to execute, saving the previous value in this memory location for later restoration. The processor $P_1$ then activates the processor $P_2$ from its hold or operating state in step 310 by toggling the processor $P_2$'s reset bit in step 314, forcing the processor $P_2$ to reset and request the system reset memory location, which is the beginning of the POST program. The POST sequence is started in step 318. Early in the course of the POST, the processor $P_2$ is directed in step 320 to the Who-Am-I register (FIG. 3), which informs it that it is a secondary processor and directs it to the reset vector memory location 40:67. This location contains the vector placed there previously by the processor $P_1$ in step 312 pointing to the reset code, which the processor $P_2$ executes in step 322. This reset code is generally similar to the reset code that processor $P_2$ executes during its initialization in step 268 (FIG. 4) at power on and includes the setting of the processor to a known state. Note, however, that the reset code that the processor $P_2$ executes in step 322 may not include the other procedures that the processor $P_2$ performed during its original initialization such as testing the cache and programming the noncacheable address map. When the processor $P_2$ has finished executing its reset code in step 322, it notifies the processor $P_1$ by setting the sleep bit in its Processor Option Register in step 324. The processor $P_2$ also initiates a request to transfer control to the vector contained at memory address 40:67 in step 324, but since its sleep bit is set, all bus accesses by the processor $P_2$ are blocked, and it is therefore essentially in a held state waiting for its sleep bit to be cleared. In this way, the processor $P_2$ is available for further dispatching in the manner described above in that the processor $P_2$ obtains directions to its new task from memory location 40:67 when its sleep bit is cleared.

After resetting the processor $P_2$ in step 314, the processor $P_1$ proceeds to poll the processor $P_2$'s sleep bit in step 316, waiting for the Processor $P_2$ to indicate that the reset operation has been completed. When the processor $P_1$ sees that the sleep bit of the processor $P_2$ is set, it proceeds to step 326 where the processor $P_1$ sets the availability bit of the processor $P_2$ in the processor available register. This signifies that the processor $P_2$ is now available for dispatching. The processor $P_1$ then returns to the execution of its code in step 328. When the operating system has another task for the processor $P_2$ to perform, it repeats the allocation cycle of FIG. 5 and, in some instances, the Reset-After-Dispatch routine of FIG. 6, as necessary.

The foregoing disclosure and description of the invention are illustrative and explanatory thereof, and various changes in the procedures, components, and circuit elements, as well as in the details of the illustrated circuitry and method of operation may be made without departing from the spirit of the invention.

What is claimed is:

1. A method for resetting multiple processors in a computer system that includes a primary processor which commences operation on reset of said computer system, a secondary processor which enters a hold state on reset of said computer system, means coupled to said primary and said secondary processors for allowing said hold state of said secondary processor to be terminated, means for storing a redirection vector, means for storing a start-up program which includes as one step determining whether said redirection vector is to be utilized, and means for storing initialization code for initializing said secondary processor, the method comprising:

said primary processor commencing said start up program and not utilizing said stored redirection vector;

said primary processor completing appropriate hardware initialization of said computer system;

said primary processor placing a redirection vector pointing to said secondary processor initialization code in said redirection vector storing means;

said primary processor activating said secondary processor;

said secondary processor commencing said start-up program and utilizing said stored redirection vector;

said secondary processor transferring operation to said initialization code pointed to by said redirection vector; and said secondary processor executing said initialization code.

2. The method of claim 1, wherein said computer system further includes a read only memory coupled to both said primary and secondary processors for storing said start-up program and said initialization code.

3. The method of claim 1, wherein said computer system further includes means for storing information indicating whether said redirection vector should be utilized and wherein said start up program references said storing means to determine redirection vector utilization, the method further comprising:

said primary processor placing information in memory indicating the utilization of said redirection vector before activating said secondary processor.

4. The method of claim 3, wherein said redirection vector utilization information storing means includes CMOS nonvolatile memory.

5. The method of claim 3, wherein said computer system further includes means for storing information indicating that said secondary processor has completed said initialization code, the method further comprising:

said primary processor polling said initialization complete storing means after activating said secondary processor;

said secondary processor placing information in said initialization complete storing means indicating that said initialization code has been executed when said initialization code has been completed; and said primary processor resuming operation after said secondary processor has placed information in said initialization complete storing means indicating that said initialization code has been completed.

6. The method of claim 5, wherein said computer system further includes means for temporarily storing the original contents of said redirection vector storing means and said redirection vector utilization information storing means, the method further comprising:

said primary processor placing the original contents of said redirection vector storing means into said temporary storing means before placing said redirection vector into said redirection vector storing means;

said primary processor placing the original contents of said utilization information storing means into said temporary storing means before placing information into said utilization storing means indicating the utilization of said redirection vector; and said primary processor restoring said original contents of said redirection vector storing means and said utilization information storing means from said temporary means after said secondary processor places information in said initialization complete storing means indicating that said initialization code has been executed.

7. The method of claim 3, wherein said computer system further includes means for placing said secondary processor on hold and removing said secondary processor from a hold state, the method further comprising:

said secondary processor placing itself on hold after executing said initialization code.

8. The method of claim 1, wherein said computer system includes only one said primary processor and only one said secondary processor.

9. The method of claim 1, wherein said computer system includes a means for differentiating between said primary and said secondary processors and said start up program references said means for differentiating to determine redirection vector utilization.

10. The method of claim 9, wherein said computer system further includes means for storing information indicating that said secondary processor has completed said initialization code, the method further comprising:
   said primary processor halting operation and polling said initialization complete storing means after activating said secondary processor;
   said secondary processor placing information in said initialization complete storing means indicating that said initialization code has been executed when said initialization code has been completed; and
   said primary processor resuming operation after said secondary processor has placed information in said initialization complete storing means indicating that said initialization code has been completed.

11. The method of claim 9, wherein said computer system includes a means for placing said secondary processor on hold and removing said secondary processor from a hold state, the method further comprising:
   said secondary processor placing itself on hold after executing said initialization code.

12. The method of claim 9, where said computer system includes only one said primary processor and only one said secondary processor.

13. A computer system having multiple processors configured in a multiprocessor environment sharing memory and input/output space, said computer system comprising:
   a primary processor which commences operation on reset of said computer system;
   a secondary processor which enters a hold state on reset of said computer system;
   means coupled to said primary and said secondary processors for allowing said hold state of said secondary processor to be terminated;
   means coupled to said primary and said secondary processors for storing a start-up program which determines whether a redirection vector is to be utilized, which is begun by both said primary and said secondary processors upon activation of operation and storing initialization code for said secondary processor;
   means for storing a redirection vector pointing to said initialization code; and
   means for directing said secondary processor to utilize said redirection vector.

14. The computer system of claim 13, wherein said start up program storing means includes a read only memory.

15. The computer system of claim 13, further including means coupled to said primary and said secondary processors for allowing communication between said primary and said secondary processors.

16. The computer system of claim 13, incorporating only one said primary and only one said secondary processor.

17. The computer system of claim 13, wherein said means for directing said secondary processor to utilize said redirection vector storing means includes a CMOS memory.

18. The computer system of claim 13, wherein said means for directing said secondary processor to utilize said redirection vector storing means includes a means for differentiating between said primary and said secondary processors.

19. The computer system of claim 13, further comprising means for storing information indicating that said secondary processor has completed said initialization code, said storing means being polled by said primary processor while said secondary processor is executing said initialization code.

20. The computer system of claim 13, further comprising means for temporarily storing the original contents of said redirection vector storing means and said redirection vector utilization information storing means.

21. The computer system of claim 13, further comprising means for placing said secondary processor on hold and removing said secondary processor from a hold state.

22. A method for dispatching tasks to processors in a computer system that includes a primary processor, a secondary processor, and means for storing a dispatch vector, comprising:
   said primary processor storing said dispatch vector in said dispatch vector storing means, said dispatch vector pointing to a task that said secondary processor is to perform;
   said primary processor activating said secondary processor:
   said secondary processor accessing said dispatch vector storing means containing said dispatch vector and transferring operation to said task; and
   said secondary processor executing said task.

23. The method of claim 22, further including said secondary processor placing itself on hold upon completion of said task.

24. The method of claim 22, further including said primary and secondary processors communicating with each other through a semaphore.

25. A method for resetting processors after dispatching in a computer system that includes a primary processor, a secondary processor that performs tasks allocated to it by the operating system of said computer system, means for differentiating between said primary and said secondary processors, means coupled to said primary processor for resetting said secondary processor, means for storing a reset vector and means for storing a start-up program that is begun by all said primary and said secondary processors on reset of said computer system which includes as one step the direction of said secondary processor to said reset vector storing means, comprising:
   said primary processor placing said reset vector in said reset vector storing means, said reset vector pointing to a reset code;
   said primary processor resetting said secondary processor;
   said secondary processor beginning said start-up program and utilizing said reset vector;
   said secondary processor transferring operation to said reset code pointed to by said reset vector; and
   said secondary processor executing said start-up program.

26. The method of claim 24, further comprising:
   said primary and said secondary processors communicating with each other through a semaphore.

27. The method of claim 24, wherein said computer system further includes means for placing said secondary processor on hold and removing said secondary processor form a hold state, the method further comprising:
   said secondary processor placing itself on hold after executing said reset code.

* * * * *